Figure 1:
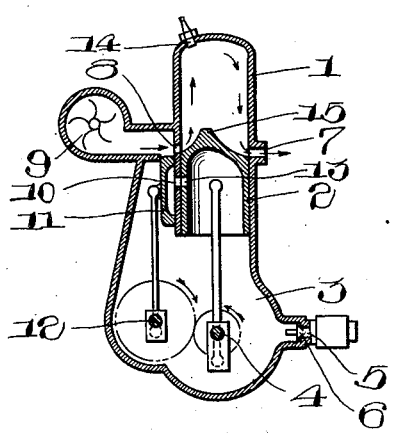

Oct. 6, 1931.  R. KONDO  1,825,959

OPERATING SYSTEM OF INTERNAL COMBUSTION ENGINES

Filed April 3, 1928

R. KONDO INVENTOR

By: Marks & Clerk
ATTYS.

Patented Oct. 6, 1931

1,825,959

UNITED STATES PATENT OFFICE

RENNOSUKE KONDO, OF TOKYO, JAPAN

OPERATING SYSTEM OF INTERNAL COMBUSTION ENGINES

Application filed April 3, 1928, Serial No. 266,986, and in Japan January 18, 1928.

The present invention relates to a new operating system for an internal combustion engine. According to the present invention, one cycle is completed by four strokes as usual, but every stroke differs from the ordinary one as follows:

Means for opening and closing the exhaust port of a cylinder is formed in a similar way to that of an ordinary two-stroke cycle engine, and the exhaust gas is discharged from the moment the upper edge of the piston reaches the upper edge of the exhaust port at the end of an explosion-stroke until the upper edge of the piston reaches that of the exhaust port again at the beginning of the next stroke. In order to drive away the exhaust gas, the air previously compressed at the outside of the cylinder or supplied at necessary and sufficient velocity is admitted into the cylinder, instead of the mixture of fuel. The air admitted into the cylinder at the beginning of the second stroke in order to drive away the exhaust gas as described above and left in the cylinder is compressed until the end of the said stroke is reached and it expands again during the next stroke, thus regaining its original volume. During the said two strokes, the said air absorbs the heat in the combustion chamber and cools the cylinder; that is to say, the said strokes are cooling-strokes. Charging is done from the instant the piston begins to open the exhaust port at the end of the said third stroke until the piston closes the port at the beginning of the next stroke. Fuel mixture previously sucked into the crank case and compressed in the said case, or previously compressed by other suitable means, or supplied at a necessary and sufficient velocity is admitted into the cylinder and drives away a part of the air left in the cylinder through the exhaust port as described above, thus occupying the greater part of the cylinder volume. The charged mixture is compressed in the cylinder during the remaining part of the fourth stroke, that is from the instant the exhaust port is closed till the end of the said stroke. Now, one operating cycle is completed, and explosion of the said compressed mixture occurs at the beginning of the next stroke.

The object of this invention is to make effective the scavenging of the exhaust gas in the cylinder, to admit a sufficient quantity of the mixture into the cylinder, to lessen the quantity of the mixture carried away together with the exhaust, to fit the engine for working at a high compression ratio and with high efficiency and to reduce the variation of torque during one cycle as compared with an ordinary four-stroke cycle engine.

The said cycle may be realized by means of a device shown in the drawings.

The accompanying drawings illustrate diagrammatically an example of carrying this invention into practice in longitudinal side elevations. Figs. 1, 2, 3 and 4 show respectively the state of four different strokes.

In the drawings, (1) is a cylinder, (2) a piston, (3) a crank-case, (4) a crank-shaft, (5) a suction port for the fuel mixture in the crank-case and (6) a non-return valve for the said port. The cylinder (1) is provided with an exhaust port (7) which is opened by passing away the upper edge of the piston at the end of the down-stroke of the said piston and an admission port (8) which is situated symmetrically opposite to the said exhaust port. A device for supplying air such as a compressor or blower is connected with the said admission port (8). The cylinder (1) is also provided with another port (10) at its lower extension under the said admission port (8), and a slide valve (11) mounted on the said two ports (8), and (10) opens and closes the said ports. (12) is a shaft for a crank or an eccentric which actuates the said valve and makes one revolution for two revolutions of the main shaft (4). The piston (2) has a port (13) which faces the port (10) at the lowest position of the said piston. (15) is a reflector on the top face of the piston; and (14), an ignition plug.

Fig. 1 shows the end of an explosion-stroke. From the instant the upper edge of the piston (2) reaches that of the exhaust port (7) until the upper edge of the piston reaches that of the exhaust port again at the beginning of the next stroke, after having passed the position shown in the drawings both the exhaust port and the admission port (8) are opened.

In this case the slide valve (11) cuts off the communication between the ports (8) and (10) and opens the admission port (8) to a device (9) for air supply. Therefore, the air supplied by the said device flows into the cylinder (1) and drives away the exhaust gases in the cylinder through the exhaust port (7). During the working stroke, that is, the time during which the piston reaches the position shown in the drawings from its top position, the mixture previously sucked into the crank-case (3) is compressed in the said case instead of being delivered into the cylinder.

Figure 2:
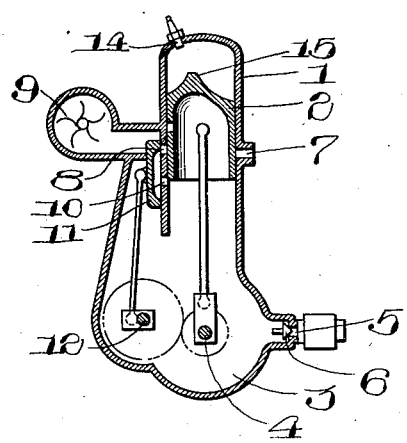

Fig. 2 shows the end of the succeeding stroke. After having closed the exhaust port (7) and the admission port (8) on rising from the position shown in Fig. 1, the piston compresses the air left in the cylinder until the said piston reaches the position shown in Fig. 2. Though the bottom side of the piston exerts sucking action on the crank case, the fuel mixture is not sucked in, because the crank-case (3) is already filled with the mixture as hereinbefore explained.

Figure 3:
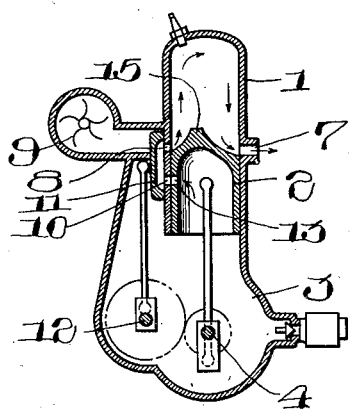

Fig. 3 shows the end of the succeeding stroke. During this stroke, the air previously compressed in the cylinder (1) in the preceding stroke expands, and the mixture in the crank-case is compressed. At the end of the stroke the exhaust port (7) is again opened and the slide valve (11) cuts off the communication between the air supplying means and the cylinder and connects the ports (8) and (10). As the said admission ports (8) and (10) are opened respectively to the cylinder and the crank-case, the compressed fuel mixture in the crank-case flows into the cylinder through the passage in the slide valve and fills the cylinder, driving away the air of the cylinder through the exhaust port (8).

Figure 4:
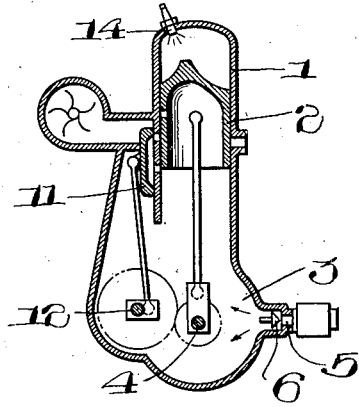

Fig. 4 shows the end of the succeeding stroke. During this stroke the fuel mixture fed into the cylinder in the preceding stroke is compressed and a fresh mixture is sucked into the crankcase (3), for instance through a carbureter. At the end of this stroke the mixture compressed in the cylinder is ignited by means of an ignition plug (14), and the work is done in the next stroke by the exploded mixture.

As an ordinary two-stroke cycle engine has an explosion stroke once every revolution, the variation of the torque is small and it has an advantage of the fatigue of structural members being less than a four-stroke cycle engine. However, there are various disadvantages accompanied due to the fact that the exhaust and the charge occur at the same time in a short period. As the exhaust gas can not be thoroughly driven away, considerable amount of the exhaust gas will be contained in the charged fresh mixture and the temperature at the beginning of the compression-stroke will become high, so that the temperature at the end of the compression will reach the critical temperature for detonation even at a relatively low compression ratio. It is difficult to adopt high compression ratio and accordingly to obtain high thermal efficiency. The amount of the fuel mixture charged in the cylinder is small, so the power generated in a given cylinder volume is reduced. As the exhaust gas is scavenged by the fuel mixture, a part of the mixture is discharged from the cylinder together with the exhaust gas, which causes a loss of fuel. The main cause of the defect mentioned above is that the mixture jets into the exhaust gas owing to its higher pressure than that of the said gas at the time of injection, and the mixture delivered into the exhaust gas is vaporized owing to the high temperature of the said gas and is discharged from the cylinder mixed with the exhaust gas.

The object of the present invention is to remove such defects. As the explosion occurs once every two revolutions in the present invention, the variation of the torque is greater than that in a two-stroke cycle engine, but is smaller than that in an ordinary four-stroke cycle engine, because the pressures on the piston surface act always in the same direction. Thus, reducing the fatigue of the structural members, the fuel mixture is mixed with the air at the lower temperature than the exhaust gas instead of being mixed with the exhaust gas, therefore, the temperature at the beginning of the compression stroke is low and accordingly it becomes possible to adopt a high compression ratio which results in high thermal efficiency as compared with an ordinary two-stroke cycle engine. As the exhaust gas is scavenged by air, the fuel is not discharged out of the cylinder together with the exhaust gas in the exhaust stroke. When the mixture flows into the cylinder and drives the air out of it, the temperature of the air is lower than that of the exhaust gas, and accordingly the density of the air is larger than that of the exhaust gas. Therefore, the mixture jets into the air less than into the exhaust gas, and the vaporization and mixing of the fuel in the air is very small due to the low temperature of the said air as compared with the case where the exhaust gas and the mixture are intermingled. Thus, the loss of the fuel caused by being discharged out of the cylinder uselessly is considerably reduced as compared with that in a two-stroke cycle engine. Moreover, the cylinder is cooled by the air forced in once by the fan 9 every two revolutions of the engine, so that cooling efficiency is superior to an ordinary two-stroke cycle or four-stroke cycle engine. If rich mixture is used and a part of the air used for cooling is utilized to mix into the said mixture, the charge is performed twice, and the cylinder is thoroughly filled with the fuel. Therefore, the power generated in a given cylinder volume is greater than in an ordinary two-stroke cycle engine.

I claim:

An internal combustion engine including a cylinder, a piston slidable in said cylinder, an exhaust port in said cylinder above the lowermost position of said piston, an admission port in said cylinder opposite said exhaust port, a blower connected with said admission port, a port in said cylinder below said admission port, a slide valve adapted to control the inlet and exhaust of scavenging air and explosive mixture, said valve sliding over said admission port and said port therebelow and a port in said piston registering with the port below said admission port at the lowermost position of said piston.

In testimony whereof I have affixed my signature.

RENNOSUKE KONDO.